United States Patent
Takizawa et al.

(10) Patent No.: US 10,733,118 B2
(45) Date of Patent: Aug. 4, 2020

(54) COMPUTER SYSTEM, COMMUNICATION DEVICE, AND STORAGE CONTROL METHOD WITH DMA TRANSFER OF DATA

(71) Applicant: HITACHI, LTD., Tokyo (JP)

(72) Inventors: Sho Takizawa, Tokyo (JP); Hideaki Fukuda, Tokyo (JP); Kyohei Ide, Tokyo (JP)

(73) Assignee: HITACHI, LTD., Tokyo (JP)

( * ) Notice: Subject to any disclaimer, the term of this patent is extended or adjusted under 35 U.S.C. 154(b) by 112 days.

(21) Appl. No.: 16/081,170

(22) PCT Filed: Aug. 24, 2016

(86) PCT No.: PCT/JP2016/074696
§ 371 (c)(1),
(2) Date: Aug. 30, 2018

(87) PCT Pub. No.: WO2018/037510
PCT Pub. Date: Mar. 1, 2018

(65) Prior Publication Data
US 2019/0012279 A1 Jan. 10, 2019

(51) Int. Cl.
*G06F 15/167* (2006.01)
*G06F 13/16* (2006.01)
(Continued)

(52) U.S. Cl.
CPC .......... *G06F 13/1668* (2013.01); *G06F 13/28* (2013.01); *G06F 13/38* (2013.01);
(Continued)

(58) Field of Classification Search
CPC .. G06F 13/1668; G06F 13/38; G06F 13/4059; G06F 13/28; G06F 13/4282; G06F 2213/0026; G06F 2213/28; G06F 3/0679; G06F 12/0246; G06F 12/0868; G06F 2212/222; G06F 2212/224; H04L 67/2842; H04L 67/1097
(Continued)

(56) References Cited

U.S. PATENT DOCUMENTS

2007/0180189 A1 8/2007 Kuwata
2008/0086585 A1* 4/2008 Fukuda .................. G06F 3/061
711/100
(Continued)

FOREIGN PATENT DOCUMENTS

JP 2007-206949 8/2007
JP 2012-043407 3/2012
(Continued)

OTHER PUBLICATIONS

International Search Report of PCT/JP2016/074696 dated Oct. 11, 2016.
(Continued)

*Primary Examiner* — Liang Che A Wang
*Assistant Examiner* — Johnny B Aguiar
(74) *Attorney, Agent, or Firm* — Mattingly & Malur, PC (57) ABSTRACT

This computer system is configured by connecting a plurality of computers via a communication network. At least one computer among the computers has a storage device and a communication device. The communication device has: a controller that controls data transmission/reception via the communication network; and an intermediate memory that stores data transmitted/received between the storage device and other calculators on the communication network.

7 Claims, 9 Drawing Sheets

(51) Int. Cl.
  *G06F 13/38* (2006.01)
  *G06F 13/40* (2006.01)
  *H04L 29/08* (2006.01)
  *G06F 13/28* (2006.01)
  *G06F 13/42* (2006.01)
  *G06F 3/06* (2006.01)
  *G06F 12/0868* (2016.01)

(52) U.S. Cl.
  CPC ...... *G06F 13/4059* (2013.01); *G06F 13/4282* (2013.01); *H04L 67/1097* (2013.01); *H04L 67/2842* (2013.01); *G06F 3/0679* (2013.01); *G06F 12/0868* (2013.01); *G06F 2212/222* (2013.01); *G06F 2213/0026* (2013.01); *G06F 2213/28* (2013.01)

(58) Field of Classification Search
  USPC .................................................. 709/212, 216
  See application file for complete search history.

(56) References Cited

U.S. PATENT DOCUMENTS

| | | |
|---|---|---|
| 2008/0104341 A1 | 5/2008 | Ihara et al. |
| 2009/0249173 A1* | 10/2009 | Torigoe .................. G06F 11/108 714/801 |
| 2010/0049902 A1* | 2/2010 | Kakihara ............ G06F 12/0873 711/103 |
| 2012/0047346 A1 | 2/2012 | Kawaguchi |
| 2013/0036286 A1 | 2/2013 | Jin et al. |
| 2013/0304978 A1* | 11/2013 | Trika .................. G06F 12/0246 711/103 |
| 2014/0351660 A1* | 11/2014 | Dahlen ............... G06F 12/0893 714/53 |
| 2016/0188464 A1* | 6/2016 | Bar-Or ................ G06F 12/0638 711/103 |
| 2016/0291884 A1* | 10/2016 | Halaharivi ............ G06F 3/0613 |
| 2017/0097782 A1* | 4/2017 | Ramalingam ......... G06F 3/0616 |

FOREIGN PATENT DOCUMENTS

| | | |
|---|---|---|
| JP | 2014-516426 A | 7/2014 |
| WO | 2006/114822 A1 | 11/2006 |

OTHER PUBLICATIONS

Japanese Office Action received in corresponding Japanese Application No. 2018-535985 dated Jan. 28, 2020.

* cited by examiner

| Tier management table 100 | | |
|---|---|---|
| Tier 102 | First computer system 104 | Second computer system 106 |
| 1 | SSD in first node | SSD in second node |
| 2 | SSD in second node | SSD in first node |
| 3 | HDD in second node | HDD in second node |
| 4 | HDD in first node | HDD in first node |

FIG. 8

| Writing destination | SCM cache mode 120 | |
| --- | --- | --- |
| | Mode OFF 124 | Mode ON 126 |
| HDD | Do not | Do |
| SSD | Do | Do |

FIG. 9

COMPUTER SYSTEM, COMMUNICATION DEVICE, AND STORAGE CONTROL METHOD WITH DMA TRANSFER OF DATA

TECHNICAL FIELD

The present invention generally relates to storage control.

BACKGROUND ART

Hyper-Converged infrastructure, which attracts attention recently, constructs a computer system through connection of a plurality of computer nodes (Hereinafter, merely termed "nodes") each accommodating a server apparatus, storage apparatus, communication apparatus, and management apparatus in one enclosure. Patent Literature 1 discloses that, in the case where a firmware in a local side node starts a Direct Memory Access (DMA) controller, the DMA controller transmits a predetermined message to a remote side node, and executes an interrupt (completion notification) toward the firmware without waiting for a completion response from the remote side node.

CITATION LIST

Patent Literature

[Patent Literature 1]
International Publication No. 2006/114822

SUMMARY OF INVENTION

Technical Problem

In accordance with the technology of Patent Literature 1, the latency to a storage apparatus of a node can be reduced. However, in a computer system based on Hyper-Converged infrastructure, one node accesses not only a storage apparatus in the one node but also storage apparatuses in the other nodes frequently. In the case of the accesses toward storage apparatuses in the other nodes, the latencies are increased by occurrence of, for example, a protocol conversion and an access request toward a CPU, as compared to the case of an access toward a storage apparatus in the one node. This reduces the total input/output (I/O) performance of a computer system based on Hyper-Converged infrastructure. Therefore, the object of the present invention is improvement of the total I/O performance of a computer system based on Hyper-Converged infrastructure.

Solution to Problem

A computer system based on an embodiment comprises a plurality of computers configured to be coupled to one another through a communication network. At least one computer of a plurality of computers comprises a storage device and a communication device. The communication device comprises a controller configured to control data transmission/reception via the communication network, and an intermediate memory configured to store data transmitted and received between a storage device and the other computers on the communication network.

Advantageous Effects of Invention

In accordance with the present invention, the total I/O performance of a computer system based on Hyper-Converged infrastructure can be improved.

DESCRIPTION OF EMBODIMENTS

In the following description, information is sometimes illustrated in such representation as "aaa table", "aaa queue", or "aaa list", however, information may be represented in any data structure. In other words, "aaa table", "aaa queue", or "aaa list" may be referred to as "aaa information" to illustrate that information is independent from data structure.

Furthermore, representations "identifying information", "identifier", "name", "appellation", and "ID" may be used when illustrating contents of each information, and these can be replaced one another.

Further, in the following description, sometimes a process is illustrated with a "program" as a subject, however, as a processor (e.g., a Central Processing Unit (CPU) executes a program, the program performs a predetermined process using at least one of a storage resource (e.g., memory) and a communication interface device, therefore the subject of the process may be the processor or an apparatus comprising the processor. Some or all of the processes executed by the processor may be performed by a hardware circuit.

The computer program may be installed from a program source. The program source may be a program distribution server or a storage media (e.g., portable storage media).

Further, in the following description, when illustrating similar elements distinctly, such reference characters as "Node 10A" and "Node 10B" may be used, when illustrating similar elements without distinction, such a common numeral in reference characters as "Node 10" may be only used.

Figure 1:
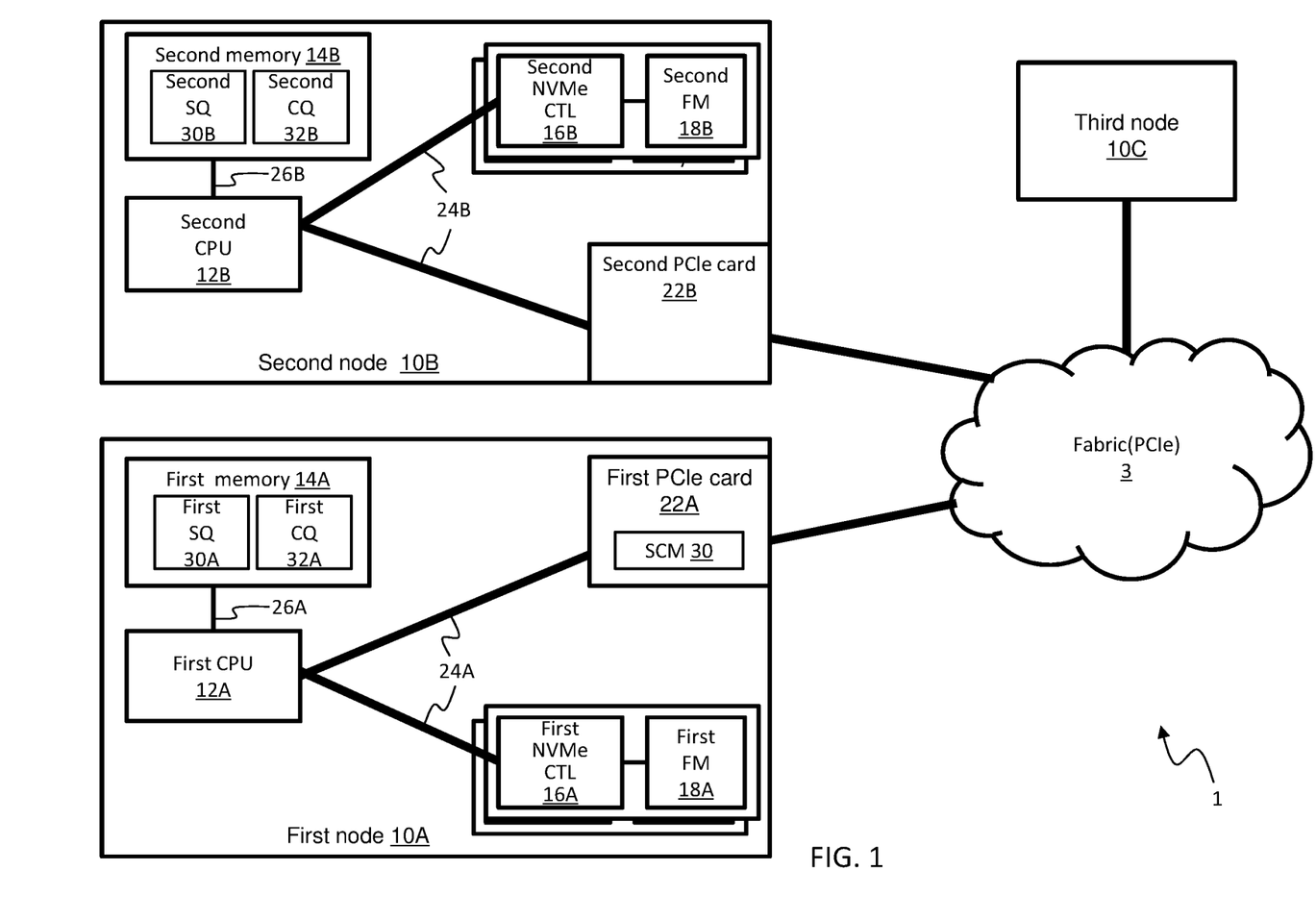
FIG. 1 illustrates a configuration example of a computer system.

FIG. 1 illustrates a configuration example of a computer system according to an embodiment.

A computer system 1 based on Hyper-Converged comprises a plurality of nodes 10. A plurality of nodes 10 are bi-directionally communicatively coupled to a switch fabric 3 based on PCIe. However, the switch fabric 3 based on PCIe is only an example of a network communication, such other communication networks as SAN (Storage Area Network), LAN (Local Area Network), and SAS (Serial Attached SCSI) and the like may be in this position. Hereinafter, a switch fabric based on PCIe is referred to as merely "fabric".

The node 10 comprises a CPU 12, a memory 14, a flash drive 18, and a PCIe card 22.

The memory 14 stores program and/or data. Examples of the memory 14 include Dynamic Random Access Memory (DRAM), Magnetoresistive Random Access Memory (MRAM), Ferroelectric Random Access Memory (FRAM), and phase-change memory. When using a nonvolatile memory as the memory 14, even in the event of power source disorder, data loss does not occur.

The CPU implements a function of node 10 by reading a program and data from memory 14 and processing them.

The flash drive 18 includes a flash memory which is an example of nonvolatile storage media and an Non-Volatile Memory Express (NVMe) controller 16 which controls data read and write, etc. on the flash memory 18. The NVMe controller 16 controls I/O (write and read) and deleting of data on the flash memory 18.

The PCIe card 22 is an example of communication device, and controls data transmission/reception conforming to PCIe protocol. The PCIe card 22 may comprise an intermediate memory (e.g., SCM 30) storing (cache) data transmission/receive between nodes 10. Note that details of the PCIe card 22 will be described below (see FIG. 2).

The PCIe card 22 with built-in SCM, CPU 12, and NVMe controller 16 may be connected with a PCIe bus 24. The CPU 12 and the memory 14 may be connected with a memory bus 26.

In the description of the present embodiment, one node of a plurality of nodes 10 is referred to as a first node 10A, and another is referred to as a second node 10B. The elements which the first node 10 comprises are referred to as a first CPU 12A, a first memory 14A, a first NVMe controller 16A, a first flash memory 18A, and a first PCIe card 22A. The elements which the second node 10 comprises are referred to as a second CPU 12B, a second memory 14B, a second NVMe controller 16B, a second flash memory 18B, and a second PCIe card 22B.

In the present embodiment, the case will be described, where commands of read and write are issued from the second CPU 12B of the second node 10B to the first node 10A. In this case, the first PCIe card 22A comprises an intermediate memory (e.g., SCM 30). The second PCIe card 22B may comprise an intermediate memory, and in this case, acts as a generic PCIe card. In the second memory 14B, a submission queue (referred to as "second SQ") 30B and a completion queue (referred to as "second CQ") 32B for the exchange of commands based on NVMe between the second CPU 12B and a processor 42 in the first PCIe card 22A may be provided. In the first memory 14A, a submission queue (referred to as "first SQ") 30A and a completion queue (referred to as "first CQ") 32A for the exchange of commands based on NVMe between the processor 42 in the first PCIe card 22 and the first NVMe controller 16A may be provided.

Figure 2:
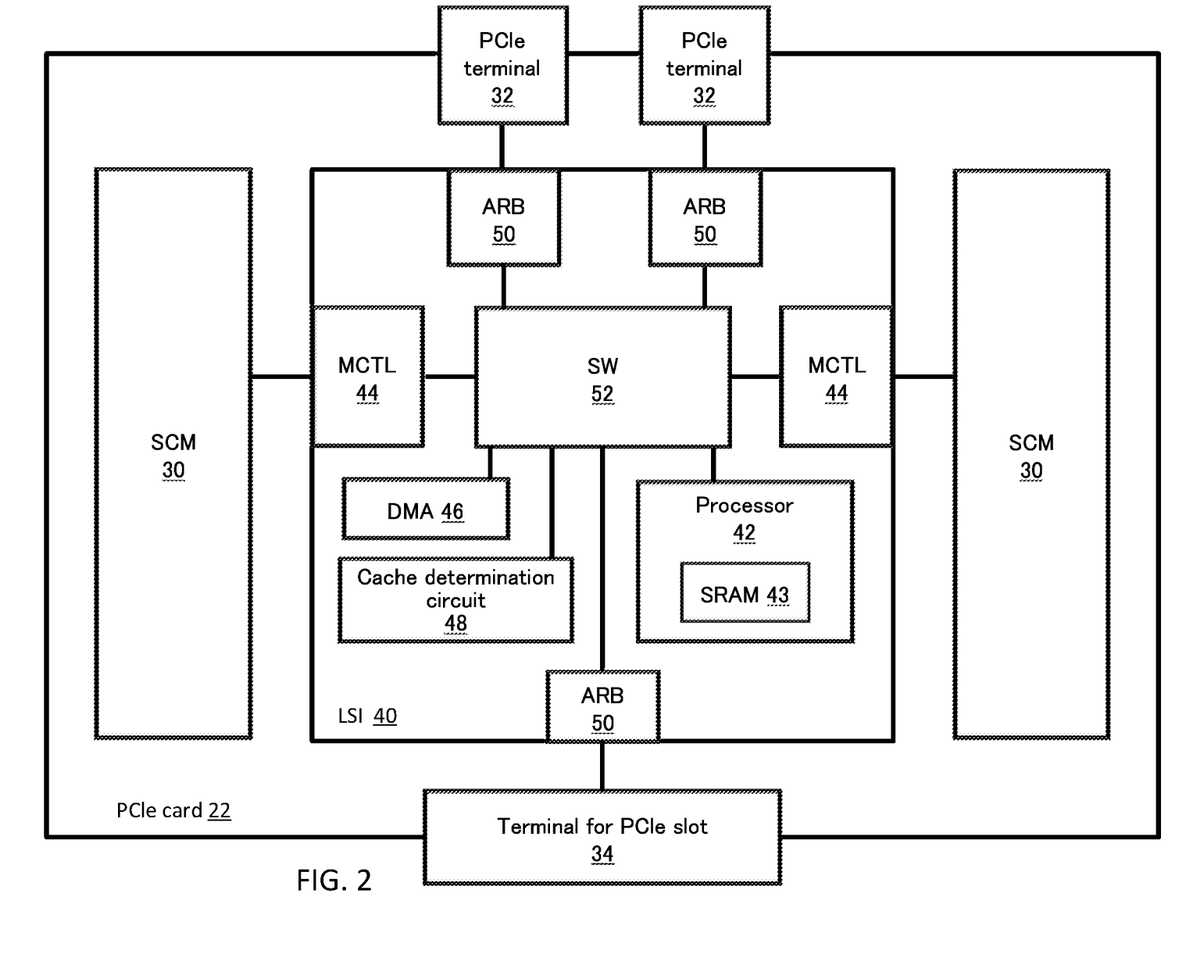
FIG. 2 illustrates a configuration example of a Peripheral Component Interconnect-Express (PCIe) card.

FIG. 2 illustrates a configuration example of a PCIe card 22 according to an embodiment.

The PCIe card 22 comprises a large-scale integration (LSI) circuit 40, a SCM 30, a PCIe terminal 32, and a terminal for PCIe slots 34. The PCIe terminal 32 is an I/F (InterFace) for connecting the node 10 to the fabric 3 through the PCIe card 22. The terminal for PCIe slots 34 is an I/F for connecting the PCIe card 22 to the PCIe bus 24 in a node 10.

The SCM 30 is a storage device comprising a nonvolatile storage media. An I/O rate of the SCM 30 may be slower than that of the memory 14 of the node 10, and faster than that of the flash memory 18. Examples of the SCM 30 are MRAM, FeRAM, and phase-change memory and the like. Note that the PCIe card 22 may comprise a volatile storage media such as a DRAM in place of the SCM 30. In this case, the PCIe card 22 may comprise a plurality of volatile storage media to secure redundancy.

The LSI 40 may comprise an arbiter (ARB) 50, a memory controller 44, a DMA controller 46, a cache determination circuit 48, and the processor 42. These components may be coupled to a predetermined switch 52, and may be bi-directionally communicative. The LSI 40 may be configured in a form of an Application Specific Integrated Circuit (ASIC) or a Field Programmable Gate Array (FPGA), etc.

The arbiter 50 is a logic circuit for coupling the PCIe terminal 32 and/or the terminal for PCIe slots 34 to the LSI 40. The memory controller 44 is a logic circuit for coupling the SCM 30 to the LSI 40. The DMA controller 46 is a logic circuit for controlling a DMA-transfer.

The cache determination circuit 48 is a logic circuit for determining if target data of a read request received by the PCIe card 22 is stored (cached) in the SCM 30. Note that in the case where this cache determination is performed with the processor 42, the LSI 40 does not need to comprise the cache determination circuit 48. The processor 42 is a logic circuit executing processes for implementing functions which the PCIe card 22 has. In the processor 42, an SRAM 43 may be provided.

Figure 3:
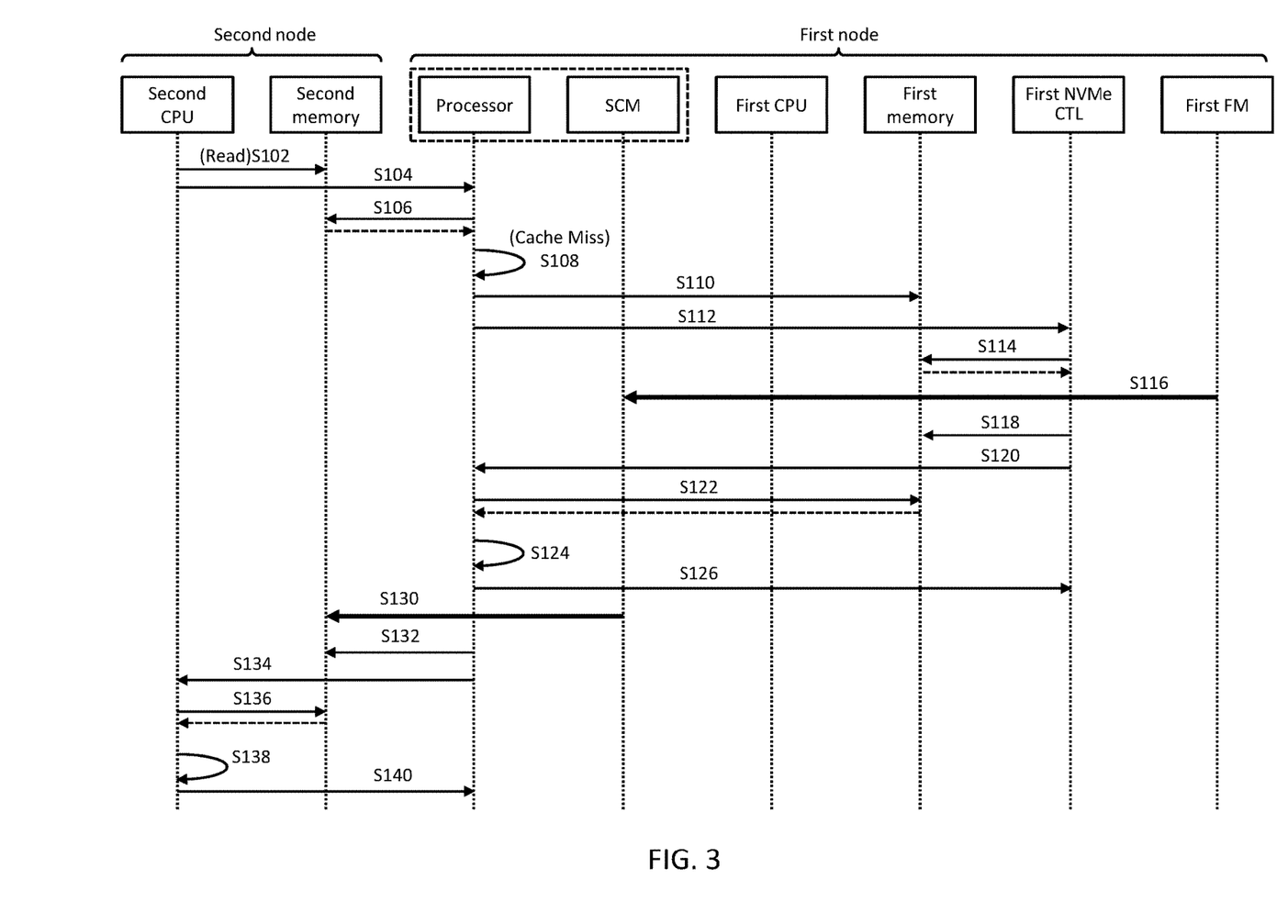
FIG. 3 shows a ladder chart illustrating a processing example when there is no read data in a Storage Class Memory (SCM) in a first PCIe card.
Figure 4:
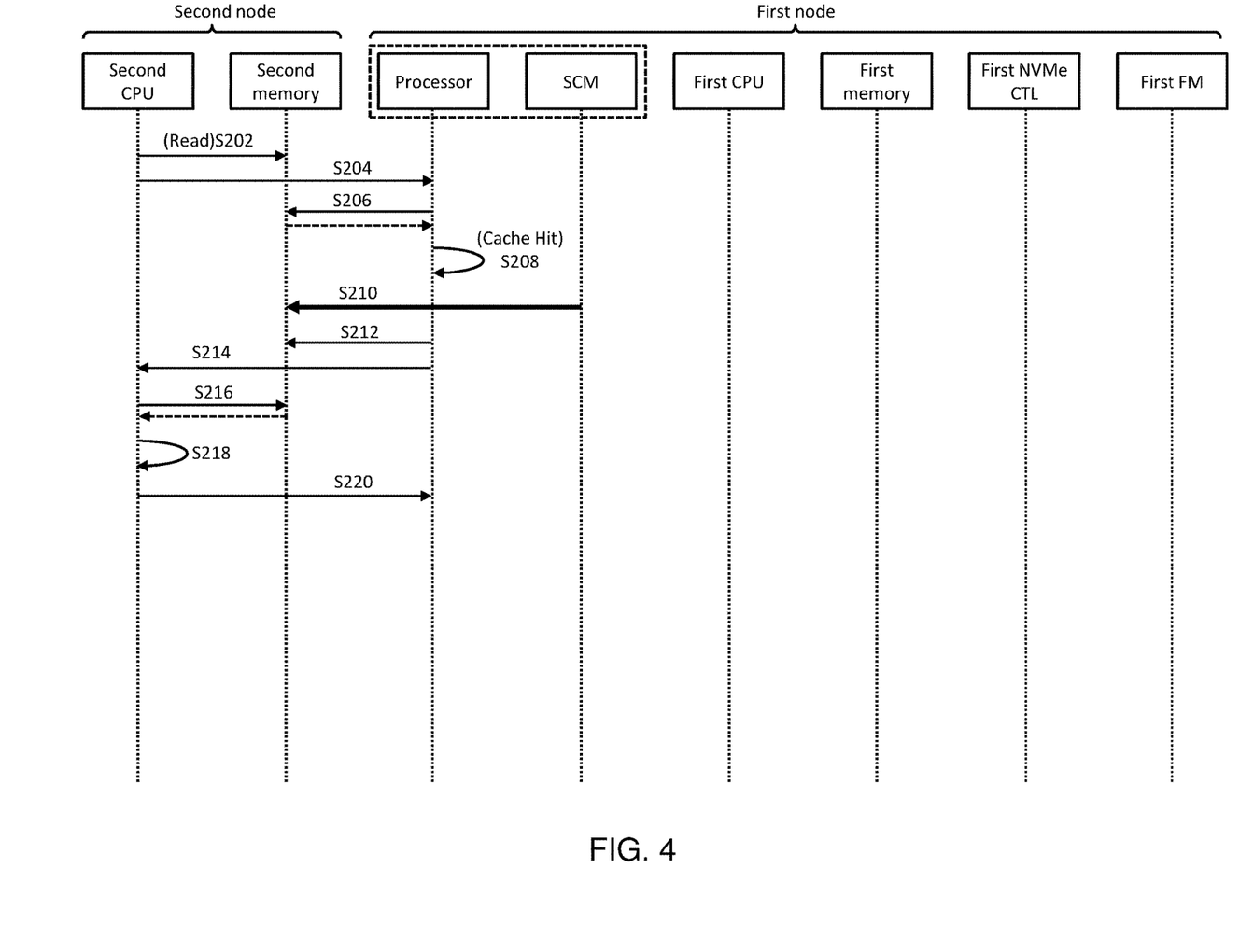
FIG. 4 shows a ladder chart illustrating a processing example when there is a read data in a SCM of a first PCIe card.

FIGS. 3 and 4 are processing examples in the case that the second CPU 12B of the second node 10B issues a read request to the first NVMe controller 16A of the first node 10A.

FIG. 3 shows a ladder chart illustrating a processing example when there is no target data of a read request in the SCM 30 in the first PCIe card 22A (cache miss).

The second CPU 12B enqueues a read request command to a second SQ 30B of the second memory 14B (S102).

The second CPU 12B increments the tail pointer of the second SQ 30B (S104).

The processor 42 in the first PCIe card 22A detects an update of the tail pointer of the second SQ 30B in S104, and fetches (dequeues) the read request command from the second SQ 30B (S106). Then the head pointer of the second SQ 30B is incremented.

The processor 42 in the first PCIe card 22A determines if a target data of a read request command fetched in S106 (referred to as "target read data") hits a cache data in the SCM 30 (S108). This determination process is referred to as a cache determination process. Detail of the cache determination process will be described below (see FIG. 5). Hereinafter, the case in which the result of the cache determination process is "cache miss" is described.

The processor 42 in the first PCIe card 22 enqueues the read request command fetched in S106 to a first SQ 30A of the first memory 14A (S110).

The processor 42 in the first PCIe card 22 increments the tail pointer of the first SQ 30A (S112).

The first NVMe controller 16A detects an update of the tail pointer in S110, and fetches the read request command from the first SQ 30A (S114). Then the head pointer of the first SQ 30A is incremented.

The first NVMe controller 16A, in accordance with the read request command in S114, performs DMA-transfer transferring the target read data in the first flash memory 18A to the SCM 30 in the first PCIe card 22A (S116).

The first NVMe controller 16A, after a completion of a DMA-transfer in S116, enqueues a completion command corresponding to the read request command (referred to as "read completion command") to a first CQ 32A of the first memory 14A (S118).

The first NVMe controller 16A notifies (executes an MSI-X interrupt) a read completion response to the processor 42 in the first PCIe card 22 (S120). Then the tail pointer of the first CQ 32A is incremented.

The processor 42 in the first PCIe card 22A receives the read completion response in S120, and fetches the read completion command from the first CQ 32A (S122).

The processor 42 in the first PCIe card 22A processes the read completion command in S122 (S124).

The processor 42 in the first PCIe card 22A increments the head pointer of the first CQ 32A (S126).

The processor 42 in the first PCIe card 22A performs DMA-transfer transferring a DMA-transferred target read data in S116 in the SCM 30 to the second memory 14B (S130). This DMA-transfer may be performed by a DMA controller in the first PCIe card 22A.

The processor 42 in the first PCIe card 22A, after a completion of a DMA-transfer in S130, enqueues a read completion command fetched in S122 to a second CQ 32B of the second memory 14B (S132).

The processor 42 in the first PCIe card 22A notifies (executes an MSI-X interrupt) a read completion response to the second CPU 12B (S134). Then the tail pointer of a second CQ 32B is incremented.

The second CPU 12B receives the read completion response in S134, and fetches the read completion command from the second CQ 32B (S136).

The second CPU 12B processes the read completion command in S136 (S138).

The second CPU 12B increments the head pointer of the second CQ 32B (S140).

FIG. 4 shows a ladder chart illustrating a processing example when there is target data (cache hit) of a read request in the SCM 30 in the first PCIe card.

The process from S202 to S206 is the same as the process from S102 to S106 in FIG. 3. Accordingly, the description is omitted.

The processor 42 in the first PCIe card 22A, as in S108, performs the cache determination processing (S208). Detail of the cache determination process will be described below (see FIG. 5). Hereinafter, the case in which the result of the cache determination process is a "cache hit" is described.

The processor 42 in the first PCIe card 22A performs DMA-transfer transferring a cache hit target read data in the SCM 30 to the second memory 14B (S210).

The process from S212 to S220 is the same as the process from S132 to S140 in FIG. 3. Accordingly, the description is omitted.

As the I/O rate of the SCM 30 is faster than that of the flash memory 18, in accordance with the process in FIGS. 3 and 4, when the cache of the SCM 30 of the first PCIe card 22 is hit, a response time (latency) corresponding to the second node 10B can be reduced. Further, when the cache of the SCM 30 is fit, as the DMA-transfer in the first node 10A (S116) does not need to be performed, a bandwidth load of an internal PCIe bus 24A in the first node 10A can be reduced.

Figure 5:
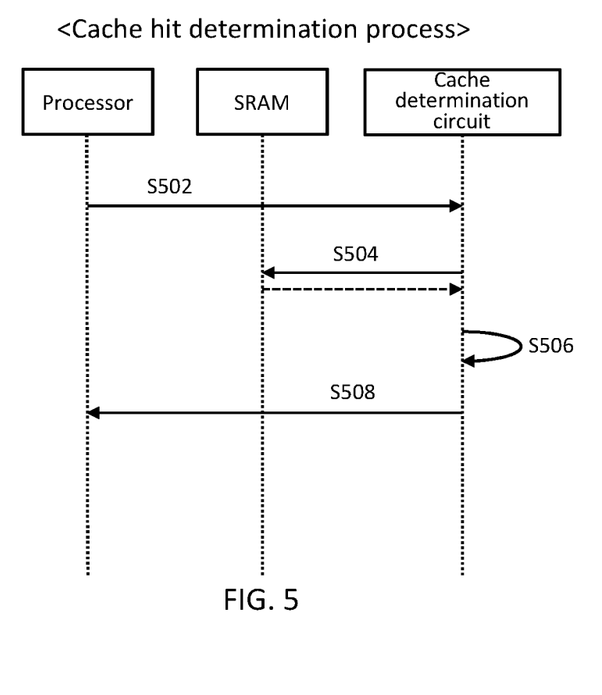
FIG. 5 shows a ladder chart illustrating a cache determination processing example.

FIG. 5 shows a ladder chart illustrating a cache determination processing example. This process is equivalent to S108 in FIG. 3 and S208 in FIG. 4.

The processor 42 starts the cache determination circuit 48 (S502).

The cache determination circuit 48 reads, from the SRAM 43, metadata (e.g., index) relating to data stored in the SCM 30 (S504).

The cache determination circuit 48, based on the metadata, determine if there is a target read data of S108 or S208 in the SCM 30 (S506).

The cache determination circuit 48 notifies a determination result in S506 to the processor 42 (S508).

Note that the process described above is an example, a cache determination may be performed in any process. For example, without using the cache determination circuit 48, a cache determination may be performed only with the processor 42. Also, without using metadata, a retrieval may be performed directly in the SCM 30.

Figure 6:
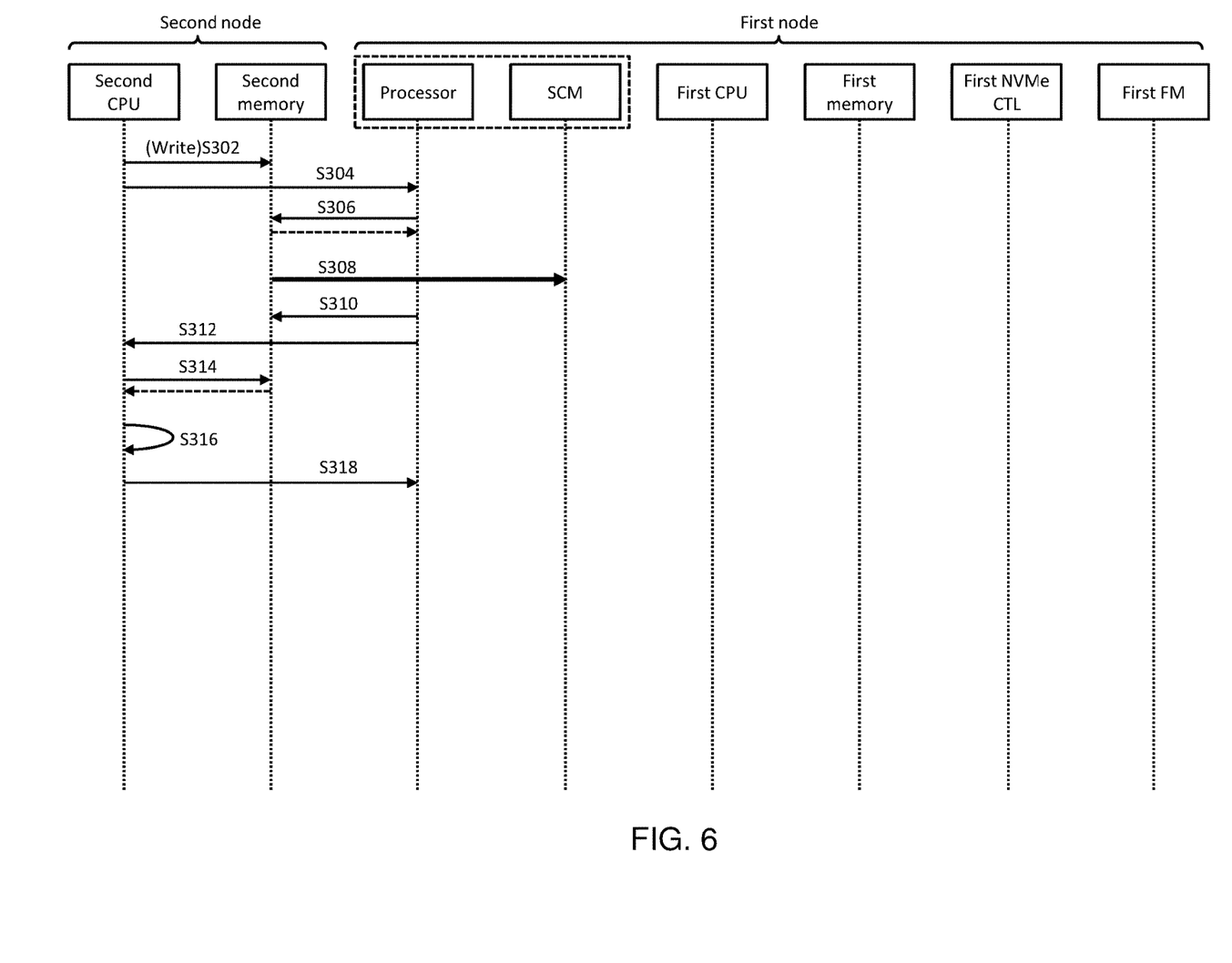
FIG. 6 shows a ladder chart illustrating a processing example of storing a target data of a write request into a SCM in the first PCIe card.
Figure 7:
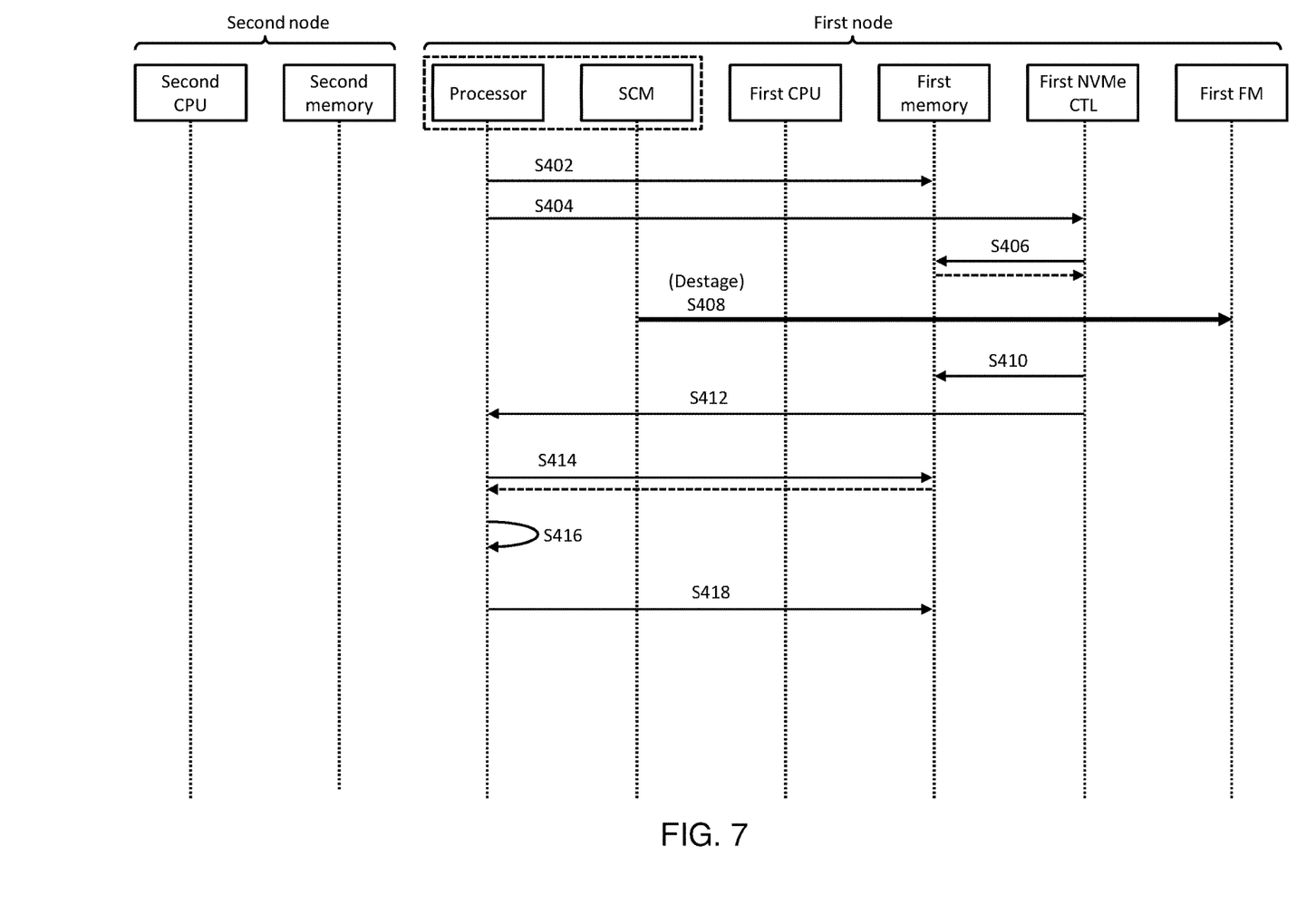
FIG. 7 shows a ladder chart illustrating an example of a destage process which transfers target write data stored in a SCM in the first PCIe card to a first flash memory.

FIGS. 6 and 7 are processing examples in the case that the second CPU 12B of the second node 10B issues a write request to the first NVMe controller 16A of the first node 10A.

FIG. 6 shows a ladder chart illustrating a processing example of storing a target data of a write request into a SCM 30 in the first PCIe card 22A.

The second CPU 12B stores a target data of the write request (referred to as "target write data") to the second memory 14B. Then the second CPU 12B enqueues a write request command to a second SQ 30B of the second memory 14B (S302).

The second CPU 12B increments the tail pointer of the second SQ 30B (S304).

The processor 42 in the first PCIe card 22A detects an update of the tail pointer of the second SQ 30B in S304, and fetches (dequeues) the write request command from the second SQ 30B (S306). Then the head pointer of the second SQ 30B is incremented.

The processor 42 in the first PCIe card 22 performs DMA-transfer transferring the target write data in the second memory 14B designated by the write request command fetched in S306 to the SCM 30 (S308). Then, considering the case of occurring a disorder of one SCM 30, dual writing may be performed by copying a target write data to the other SCM 30.

The processor 42 of the first PCIe card 22A, after a completion of a DMA-transfer in S308, enqueues a completion command corresponding to the write request command (referred to as "write completion command") to the second CQ 32B (S310).

The processor 42 in the first PCIe card 22A notifies (executes an MSI-X interrupt) a write completion response to the second CPU 12B (S312). Then the tail pointer of a second CQ 32B is incremented.

The second CPU 12B receives the write completion response in S312, and fetches the write completion command from the second CQ 32B (S314).

The second CPU 12B processes the write completion command in S314 (S316).

The second CPU 12B increments the head pointer of the second CQ 32B (S318).

Due to the process above, a write data issued from the second node 10B is stored in the SCM 30 in the first PCIe card 22A.

FIG. 7 shows a ladder chart illustrating an example of transferring process ("destage process") which transfers target write data stored in the SCM 30 in the first PCIe card 22A to the first flash memory 18A.

The processor 42 in the first PCIe card 22A, at a predetermined timing, enqueues the write request command to the first SQ 30A of the first memory 14A (S402). Examples of the predetermined timing are a case in which a process load of a processor is light, a case in which an I/O load of the SCM 30 is light, a case in which a process load of the first CPU 12A or the first NVMe controller 16A is light, a case in which an I/O load of the first flash memory 18A is light, or a case in which a bandwidth load of the internal PCIe bus 24A of the first node 10A is light.

The processor 42 in the first PCIe card 22A increments the tail pointer of the first SQ 30A (S404).

The first NVMe controller 16A detects an update of the tail pointer of the first SQ 30A in S404, and fetches (dequeues) the write request command from the first SQ 30A (406). Then the head pointer of the first SQ 30A is incremented.

The first NVMe controller 16A performs DMA-transfer transferring a target write data stored in the SCM 30 in S308 in FIG. 6 to the first flash memory 18A (S408). This process is referred to as a destage process. This DMA-transfer (destage process) may be performed by a DMA controller 46 in the first PCIe card 22A.

The first NVMe controller 16A, after a completion of a DMA-transfer in S408, enqueues a completion command corresponding to the write request command in S406 to the first CQ 32A of the first memory 14A (S410).

The first NVMe controller 16A notifies (executes an MSI-X interrupt) a write completion response to the processor 42 in the first PCIe card 22A (S412). Then the tail pointer of the first CQ 32A is incremented.

The processor 42 in the first PCIe card 22A receives the write completion response in S412, and fetches the write completion command from the first CQ 32A (S414).

The processor 42 in the first PCIe card 22A processes the write completion command in S414 (S416).

The processor 42 in the first PCIe card 22A increments the head pointer of the first CQ 32A (S418).

Due to the process above, a target write data stored in the SCM 30 in the first PCIe card 22A is transferred (destaged) to the first flash memory 18A.

In accordance with FIGS. 6 and 7, as a write completion response is notified to the second node 10B at a timing at which a target write data is stored in the SCM 30 of the first PCIe card 22A, a response time (latency) corresponding to the second node 10B can be reduced comparing with the case of storing the target write data to the first flash memory 18A in the first node 10A. In the present embodiment, a destage destination of a write data is a flash memory, however, the destage destination may be HDD (Hard Disk Drive). In this case, latency corresponding to the second node 10B becomes significantly low.

Also, as the processor 42 of the first PCIe card 22A shows performing virtually an operation of the first NVMe controller 16A to the second node 10B, the second CPU 12B may be a generic NVMe driver. Similarly, as the processor 42 of the first PCIe card 22A shows performing virtually an operation of the second CPU 12B to the first NVMe controller 16A, the first NVMe controller 16A may be a generic NVMe controller.

Furthermore, when write data whose amount is equal to or larger than the certain reference is stored to the SCM 30, or when a process load of the first node 10A is light, by destaging the write data stored in the SCM 30 to the first flash memory 18A, the process load of the first node 10A and a bandwidth load of an internal PCI bus 24A can be equalized.

Figure 8:
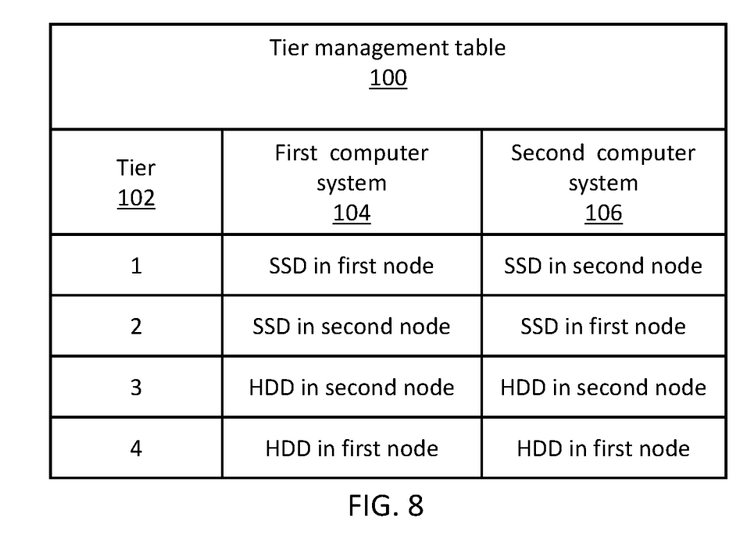
FIG. 8 illustrates an example of a tier management table.

FIG. 8 illustrates an example of a tier management table 100.

Depending on an I/O rate of a storage device, the storage device is classified hierarchically. For example, the highest rate class is "tier 1", the next high rate class is "tier 2", and the lowest rate class is "tier 3". Typical order of the I/O rate is, in the order that first is the highest, SCM, SSD (Solid State Drive), and HDD. In this case, conventionally, SCM is in tier 1, SSD is in tier 2, and HDD is in tier 3.

However, in the present embodiment, a certain node 10 sometimes has smaller latency even including a delay of a fabric 3 when an I/O request (e.g., write request/read request) is issued to an SSD or an HDD of another node 10 comprising the PCIe card 22 with the built-in SCM 30, comparing with when an I/O request is issued to an internal SSD or an internal HDD. It is because the PCIe card 22 returns a completion response at a time point at which data is stored in the SCM 30.

Therefore in the present embodiment, tiers to which storage devices of the own node and other nodes belong are determined based on actual latencies.

FIG. 8 is an example of a tier management table 100 in which information regarding the tier determined by the second node 10B and information regarding the tier determined by third node 10C in the case that the first node 10A comprises an SSD and an HDD, and the PCIe card 22 with the built-in SCM 30. In other words, the tier management table 100 is an example of a table managing a performance of a storage.

As illustrated by FIG. 8, in a first computer system, the second node 10B may set the SSD of the first node 10A in tier 1 and the SSD of the second node 10B in tier 2 when the latency to the SSD comprised by the first node 10A which is the other node is smaller than the latency to the SSD comprised by the second node 10B itself.

In a second computer system, the second node 10B may set the SSD of the second node 10B in tier 1 and the SSD of the first node 10A in tier 2 when the latency to the SSD comprised by the second node 10B itself is smaller than the latency to the SSD comprised by the first node 10A which is the other node. For example, when a traffic of a communication network is a bottleneck, or when destage processes in FIG. 7 occur extensively, even if the first node 10A as the other node comprises the PCIe card 22 with the built-in SCM 30, it is still probable that the latency to the SSD comprised by the second node 10B itself is smaller.

The tier management table 100 may be held in each node 10, or held in a predetermined node which can be accessed in common by each node 10.

Thereby, each node 10 can store data required of relatively high speed I/O in a storage device which has an actual small latency. In other words, the total I/O performance of the computer system 1 may be improved.

Figure 9:
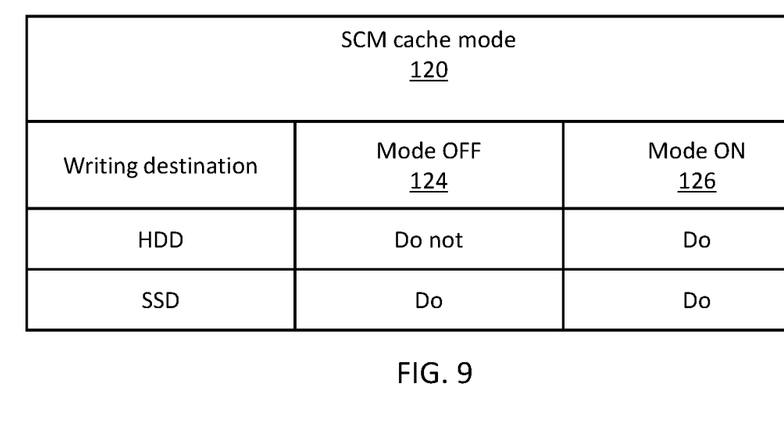
FIG. 9 shows a table for illustrating a SCM cache mode.

FIG. 9 shows a table for illustrating a SCM cache mode.

The PCIe card 22 with the built-in SCM 30 may comprise a setting for switching do/do not for storing (caching) the SCM 30 with a write data for a HDD connected to the PCIe card 22 via an internal bus in a node 10. This setting is referred to as a SCM cache mode.

As shown in table 120 in FIG. 9, when a SCM cache mode is ON 126, the PCIe card 22 stores (caches) the SCM 30 with write data for both the HDD and the SSD connected via the internal bus. In this case, a latency of a write request to the HDD becomes significantly small, however, as the number of destage times from the SCM 30 to the HDD becomes large, a cache hit rate of the SCM 30 concerning a read request for the SSD becomes low. Accordingly, an average latency of a read request for the SSD becomes larger than that in the case in which a SCM cache mode described below is OFF 124.

When the SCM cache mode is OFF 124, the PCIe card 22 stores (caches) the SCM 30 with write data for the SSD connected via the internal bus, however, do not store (cache) the SCM 30 with write data for the HDD. In this case, an average latency of a read request for the SSD becomes smaller than that in the case in which a SCM cache mode described above is ON 126, however, a latency of a write request for the HDD becomes significantly large.

Note that when the HDD is connected via SAS, the PCIe card 22 has to support SAS as well as NVMe.

Which is proper ON or OFF of a SCM cache mode is different depending on characteristics of data read and write of applications.

The embodiments described above are exemplifications for description of the present invention, thereby no limitation of the scope of the invention only to the embodiments is intended. Those skilled in the art can implement the invention in other various aspects without departing from the spirit of the invention.

REFERENCE SIGNS LIST

1: computer system
10: node
12: CPU
14: memory
16: NVMe controller
18: flash memory
22: PCIe card
30: SCM

The invention claimed is:

1. A computer system configured by connecting a plurality of computers via a communication network,
wherein at least one computer of the plurality of computers is configured to comprise a storage device and a communication device,
wherein the communication device comprises
a controller configured to control data transmission/reception via the communication network, and
an intermediate memory configured to store data transmitted and received between the storage device and another computer on the communication network,
wherein the intermediate memory is a non-volatile memory configured to have a higher input/output (I/O) rate than a rate of the storage device,
wherein when receiving a read request from another computer,
the controller of the communication device is configured
to determine if a target read data of the read request is stored in the intermediate memory,
to send the read data stored in the intermediate memory back to the another computer if the determination is affirmative, and
to transfer the read request to the storage device if the determination is negative,
wherein the storage device, which receives the read request transferred from the communication device, is configured to store in the intermediate memory the read data relating to the read request,
wherein the communication device is further configured to include a Direct Memory Access (DMA) controller,
wherein the DMA controller is configured to perform DMA-transfer for transferring the read data stored in the intermediate memory from the intermediate memory to a memory of the another computer, and
wherein the memory of the another computer is an issuing source of the read request.

2. The computer system according to claim 1,
wherein when receiving a write request and a write data from the another computer,
the controller of the communication device is configured
to store the write data to the intermediate memory, to send a write completion back to the another computer, and
to store the storage device at a predetermined timing with the stored write data in the intermediate memory.

3. The computer system according to claim 1,
wherein at least one computer of the plurality of computers is configured to comprise a storage performance management table including such a lower I/O latency storage device registered as a higher performance storage device among an own storage device and the storage device in the at least one computer comprising the communication device.

4. The computer system according to claim 1,
wherein at least one computer of the plurality of computers comprises,
the communication device,
a first storage device with a rate lower than a rate of the intermediate memory, and a second storage device with a rate lower than the rate of the first storage device,
wherein the communication device is configured to comprise a setting for switching do/do not for storing the intermediate memory with a write data for the second storage device.

5. The computer system according to claim 1,
wherein the communication network is configured to conform to peripheral component interconnect express (PCIe), and
the storage device is configured to conform to Non-Volatile Memory Express (NVMe).

6. A communication device, comprising:
a controller configured to control data transmission/reception via a communication network; and
an intermediate memory configured to store data transmitted and received between a storage device and another computer on the communication network connected via an internal bus,
wherein the intermediate memory is a non-volatile memory configured to have a higher input/output (I/O) rate than a rate of the storage device,
wherein when receiving a read request from the another computer,
the controller is configured
to determine if a target read data of the read request is stored in the intermediate memory,
to send the read data stored in the intermediate memory back to the another computer if the determination is affirmative, and
to transfer the read request to the storage device if the determination is negative,
wherein the storage device, which receives the read request transferred by the controller, is configured to store in the intermediate memory the read data relating to the read request, wherein the communication device is further configured to include a Direct Memory Access (DMA) controller, wherein the DMA controller is configured to perform DMA-transfer for transferring the read data stored in the intermediate memory from the intermediate memory to a memory of the another computer, and wherein the memory of the another computer is an issuing source of the read request.

7. A storage control method, wherein a computer comprises a storage device and a communication device, wherein the communication device comprises a controller and an intermediate memory which is a non-volatile memory configured to have a higher input/output (I/O) rate than a rate of the storage device, wherein the controller of the communication device
  receives a write request and a write data from another computer,
  stores the write data to the intermediate memory, to send a write completion back to the another computer, and
  stores the write data from the intermediate memory to the storage device at a predetermined timing, wherein when receiving a read request from the another computer, the controller
  determines if a target read data of the read request is stored in the intermediate memory,
  sends the read data stored in the intermediate memory back to the another computer if the determination is affirmative, and
  transfers the read request to the storage device if the determination is negative, wherein the storage device, which receives the read request transferred by the controller, stores in the intermediate memory the read data relating to the read request, wherein the communication device is further configured to include a Direct Memory Access (DMA) controller, wherein the DMA controller performs DMA-transfer for transferring the read data stored in the intermediate memory from the intermediate memory to a memory of the another computer, and wherein the memory of the another computer is a source of issuing the read request.

* * * * *